United States Patent
Patterson et al.

(10) Patent No.: US 11,863,559 B2
(45) Date of Patent: *Jan. 2, 2024

(54) SECURE REMOTE SUPPORT AUTHORIZATION

(71) Applicant: NCR Corporation, Atlanta, GA (US)

(72) Inventors: Jason Patterson, Tarzana, CA (US); Nir Veltman, Johns Creek, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/243,874

(22) Filed: Apr. 29, 2021

(65) Prior Publication Data

US 2021/0250360 A1 Aug. 12, 2021

Related U.S. Application Data

(63) Continuation of application No. 15/420,038, filed on Jan. 30, 2017, now Pat. No. 11,025,635.

(51) Int. Cl.
*G06F 21/00* (2013.01)
*H04L 9/40* (2022.01)

(52) U.S. Cl.
CPC ........ *H04L 63/102* (2013.01); *H04L 63/0884* (2013.01); *H04L 63/108* (2013.01)

(58) Field of Classification Search
CPC . H04L 63/102; H04L 63/0884; H04L 63/108; G06F 21/6218
See application file for complete search history.

(56) References Cited

U.S. PATENT DOCUMENTS

| | | | | |
|---|---|---|---|---|
| 8,955,149 | B1 * | 2/2015 | Baer | G06F 21/6218 726/28 |
| 9,473,505 | B1 * | 10/2016 | Asano | H04L 63/102 |
| 2003/0200442 | A1 * | 10/2003 | Bhat | H04L 63/102 713/182 |
| 2007/0050369 | A1 * | 3/2007 | Stiegler | G06F 21/53 707/999.009 |
| 2007/0136195 | A1 * | 6/2007 | Banjo | H04M 15/83 705/43 |
| 2009/0300711 | A1 * | 12/2009 | Tokutani | G06F 21/6218 726/1 |
| 2010/0154043 | A1 * | 6/2010 | Castellucci | G06F 21/6218 726/9 |
| 2012/0260330 | A1 * | 10/2012 | Zlatarev | H04L 63/0884 726/10 |
| 2013/0167249 | A1 * | 6/2013 | Birtwhistle | G16H 10/60 726/28 |
| 2013/0311360 | A1 * | 11/2013 | Tullis | G06Q 20/385 705/39 |
| 2015/0242850 | A1 * | 8/2015 | Priebatsch | G06Q 20/40 705/64 |
| 2018/0150650 | A1 * | 5/2018 | Saunders | H04L 63/104 |
| 2018/0191700 | A1 * | 7/2018 | Kong | H04L 63/0807 |

* cited by examiner

*Primary Examiner* — Michael M Lee (74) *Attorney, Agent, or Firm* — Schwegman Lundberg & Woessner, P.A.

(57) ABSTRACT

A request for access to a user's account is made to an authenticator. The authenticator sends a request for access to the user associated with the user's account. In response to user authorization, the authenticator sends an access link to a service engineer. The service engineer access the link to access the user's account with limited and restricted access. When a remote service session associated with the activated access link is terminated, the authenticator sends a termination of session notice to the user.

20 Claims, 5 Drawing Sheets

SECURE REMOTE SUPPORT AUTHORIZATION

CROSS-REFERENCE TO RELATED APPLICATION

This application is a continuation of U.S. patent application Ser. No. 15/420,038, filed Jan. 30, 2017, which application and publication are incorporated herein by reference in their entirety.

BACKGROUND

Traditional network-based support includes a processing flow where users are required to relinquish their credentials that are used for accessing their website service when issues arise. This is insecure because the user's credentials are known by someone other than the user. Moreover, these type of situations (where the user needs support) often lead to user identity theft. The problem is exacerbated by the fact that many web sites outsource support to foreign countries, such that tracking the identity theft can be extremely difficult if not impossible.

Further, the support individual may be not be so brazen as to alter anything in the user's account with the website; rather, theft is often more surreptitious and usually entails appropriating confidential information from the user's website account for purposes of delayed identity theft. However, sometimes the user will not even change their website credentials after remote network service in which the user supplies his/her credentials, which means the support individual can subsequently access the user's account to perform unauthorized transactions, or, and more likely, provide the user's credentials to a third party to perform the unauthorized transactions.

In fact, there are a host of security issues associated with a user providing his/her credentials for support; some of which may be unrelated to actual security breaches and more related to the user's perception of a potential security breach. For example, some users may refuse to provide his/her credentials and, therefore, are unable to get needed support, which may cause those users to switch website providers for the service that is in need of support, which becomes a customer retention and loyalty problem for the website provider.

Yet, logging in as the user (by a support individual) into a user's website service may be needed in certain situations. For instance, the user may be encountering an interface or a transaction problem while accessing the website from a particular state/processing path that confuses the support individual and which is not being experienced by other users of the website service.

SUMMARY

In various embodiments, methods and systems for secure remote support authorization are presented.

According to an embodiment, a method for secure remote support authorization is provided. Specifically, and in one embodiment, an access request is received from a first principal. Then, a permission is requested from a second principal associated with the access request. An access link is delivered to the first principal in response to the permission received back from the second principal. Next, a session is authenticated for access by the first principal to an account of the second principal and in response to an activated access link. The session is terminated in response to a detected termination event.

DETAILED DESCRIPTION

Figure 1A:
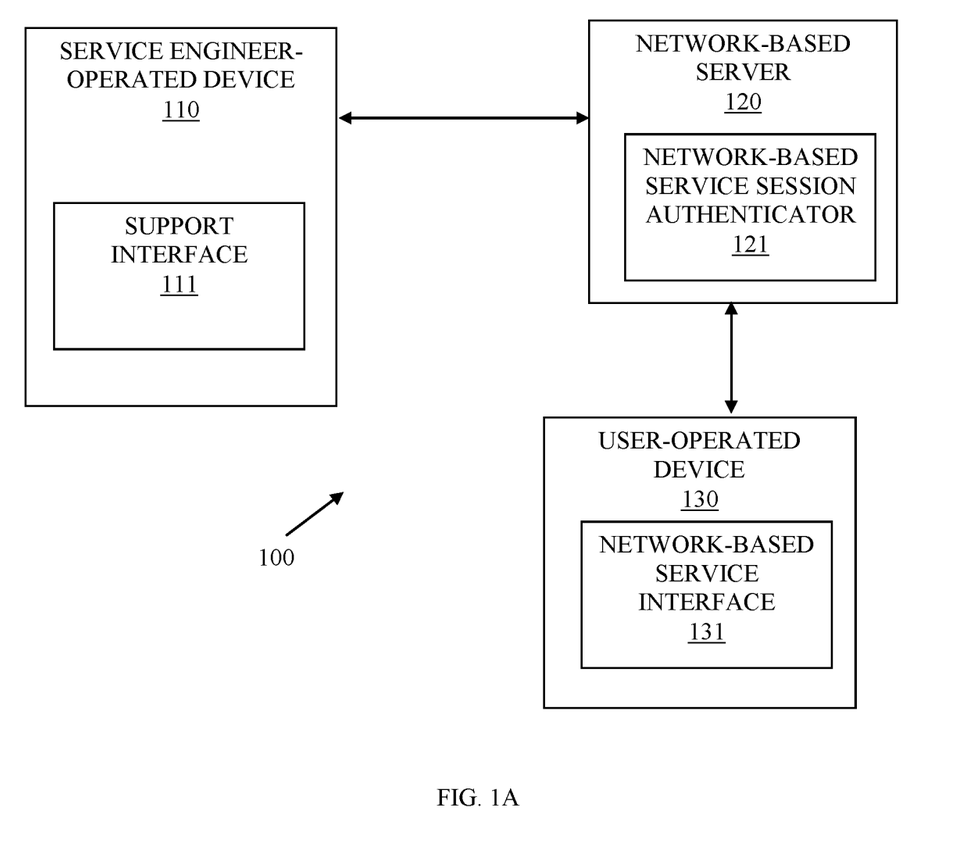
FIG. 1A is a diagram of a system for secure remote support authorization, according to an example embodiment.

FIG. 1A is a diagram of a system 100 for secure remote support authorization, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the secure remote support authorization techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for secure remote support authorization can be implemented in all, or some combination of the components shown in different hardware computing devices having one or more hardware processors.

The system 100 includes: a service engineer operated device 110 having a support interface 111, a network-based server 120 having a network-based service authenticator 121, and a user-operated device 130 having a network-based service interface 131.

During operation, the components of the system 100 interact with one another to provide secure remote and authenticated access to a user's network-based service (through the user's account). This access to a service engineer can be controlled and limited in duration and authorized in advance by the user. The interaction of the components are now discussed with reference to the FIG. 1B.

Figure 1B:
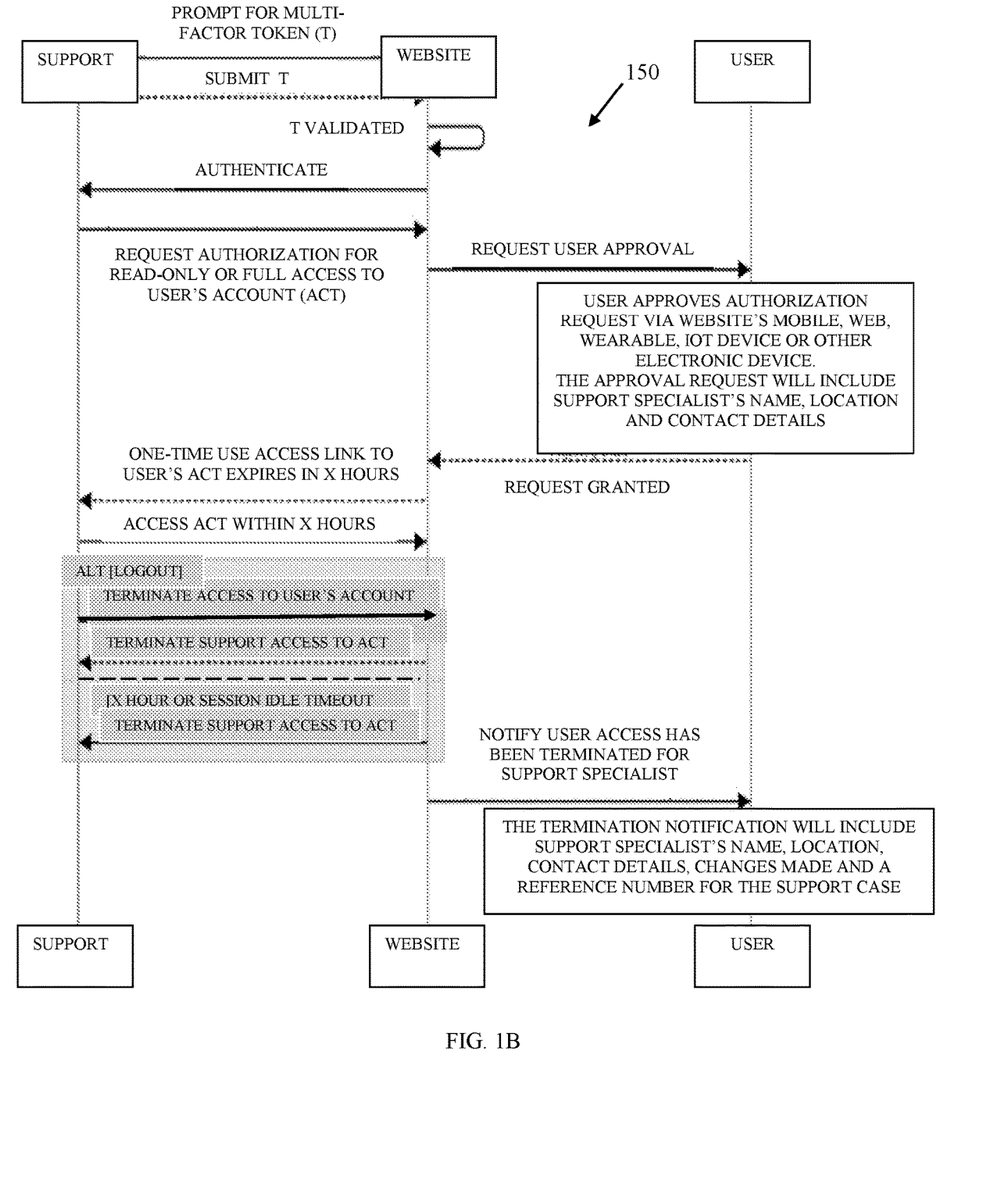
FIG. 1B is a diagram of a sample processing flow and method for secure remote support authorization, according to an example embodiment.

FIG. 1B is a diagram of a sample processing flow and method 150 for secure remote support authorization, according to an example embodiment.

Initially, a support ticket is opened by the network service (operating on the network-based server 110 (can be a set of servers 110 or even a cloud processing set of cooperating devices 110). The support ticket identifies a problem/issue that a user is having with the network-based service. The ticket may be generated by: 1) the user through the network-based service interface 131, 2) a first-level support person with whom the user has an audio call with regarding the issue, 3) a support person interacting with the user through an online chat session, and perhaps through the network-based service interface 131 or a chat interface, 4) a support person receiving an email regarding the issue from the user, and/or 5) through an automated mechanism associated with the network based service, which the user may or may not be aware of.

The support ticket may entail investigation and work by multiple different levels of support staff before arriving in the support interface 121 as a problem that the service engineer is assigned to work on for resolution.

It is noted that it can also be the case that the user was directly working with the service engineer when the support ticket was generated.

The service engineer (identified as "support" in the FIG. 1B) operates the service-engineer operated device 110 and attempts to access the support interface 111. This causes the authenticator 121 of the network-based server 120 to prompt the support interface 111 for a multifactor token for authenticating the service engineer, and perhaps also, the service engineer-operated device 110 for authenticated access the server 120 in response to the service engineer providing the requested multifactor token through the interface 111.

At this point in time, the service engineer has authenticated access to the network-based server 120 and the network-based service (website in the FIG. 1B) and an "authenticated" message and handle is returned to the support interface 111 from the network-based session authenticator 111 (just "authenticator 111" hereinafter).

The service engineer may have previously determined that he/she needs to access the website as the user having the problem to identify the cause of the problem on behalf of the user.

After the service engineer determines that resolution necessitates that the service engineer log into the network-based service through the user's account. The service engineer sends a request (through interface 111) for read-only or full access to the website using the user's account for the website.

The authenticator 121 pushes a dynamic message to the user through the network-based service interface 131 requesting the user's approval for the service engineer's requested level of access to the user's website account. The requested access message includes a variety of information for the user to make an informed decision, such as: the full name of the support engineer, contact details for the support engineer, a geographical location where the support engineer is located, a ticket number for the problem being investigated, and any other configured information. The user maintains control and can deny the request based on the information provided with the requested-access message from the authenticator 121.

Assuming, the user through the network-based service interface 131 approves the remote service engineer's access request, the authenticator 121 returns an access link, which provides a limited use access to the user's account with the website. The access link may include an encrypted token that permits the authenticator to authenticate the service engineer for the access to the user's website account and uniquely identifies: the service engineer, the service-engineer operated device 110, the user, the user's account, and access permissions (restrictions associated with the access link).

Some example access permissions (restrictions) can include a single-access restriction that once activated by the service engineer expires after a configurable period of elapsed time (such as 2 hours). The access permissions (restrictions) may also (as previously noted) provide: 1) read only access, 2) full access (read and write) to any resource available in the user's account (such that the service engineer's access allows any action (operation) that the user could perform when logged into the website account); 3) limited read access to selective resources (some resources typically available to the user are not even capable of being read by the service engineer during the limited access); 4) limited write access (some operations typically available to the user cannot be processed by the service engineer during the limited access); and/or 5) full read access with limited write access.

Once the service engineer receives the access link and activates through the interface 111, the authenticator 121 authenticates the service engineer through the encrypted token for access and obtains the access restrictions for access. In some cases, the authenticator may also trigger a tracking and/or auditing service that tracks and records all operations and resources accessed by the service engineer during the service engineer's limited access to the user's website account.

It should also be noted that the access link provided to the service engineer is only visible and/or can only be accessed by the service engineer from within the interface 111, which means that the service engineer is already in a multifactor authenticated session with the website when the service engineer access the access link. So, if the service engineer were to copy and save the link and attempt to access outside the authenticated session, the authenticator 121 would not authorize the access attempt.

The service engineer can then investigate the user's website account to identify and, potentially, resolve the issue or problem that the user was experiencing with the website service.

Termination of the service engineer's limited access to the website account can occur in a variety of manners, such as: the service engineer terminating the session intentionally, an access restriction was reached (the time period for access exceeds the pre-configured period of elapsed time for access), the session was abnormally terminated (fault condition), and the like. Therefore, the session may terminate based on actions of the service engineer (intentionally or unintentionally), actions by the authenticator 121 (an access restriction for termination was reached), and/or processing faults caused by the service engineer-operated device 110, the server 120, a network connection between the device 110 and the server 120, and/or a software fault with any of the software being processed during the session on the device 110 and/or the server.

Once the termination of the service engineer's limited access to the user's website account, the authenticator 121 sends a second message to the user through interface 131. The termination message may also include a variety of information to the user, such as: any service engineer messages that the service engineer wanted the user to know about the limited access, the service engineer's name, location, contact details, and reference number with link to the ticket or resolution for the problem. The reference link can also include the service engineer messages, such that these messages do not have to be in the termination message in all situations.

Furthermore, in some cases, the specific operations performed and resources accessed by the service engineer may be captured in an audit log, which may or may not be provided for user access through the reference link.

In an embodiment, the user-operated device is one of: a phone, a tablet, a wearable processing device (watch, googles, etc.) a tablet, a laptop, a desktop, and/or an intelligent appliance having processor capabilities such that it is part of the Internet-of-Things (IoTs).

In an embodiment, the network-based service interface 121 is a web rendered interface to a browser that executes on the user-operated device 120.

In an embodiment, the network-based service interface 121 is a mobile application that executes on the user's device 120. In an embodiment, the request for access message sent to the user and the termination notification message sent to the user is done through a push notification to the users device 120, with the Operating System (OS) of the device 120 permits and uses to wake up or initiate the mobile application (such as iOS®).

In an embodiment, the access link is provided from the authenticator 121 to the support interface 111 as a Hyper Text Markup Language (HTML) or an HTML over Hyper Text Transfer Secure Socket Layer Protocol (HTTPS) link. In an embodiment, the support interface 111 is a browser-based interfaced rendered to a browser that executes on the service engineer-operated device 110.

A "resource" as used herein refers to something executed of viewed while the service engineer has limited access, such as but not limited to: a specific webpage view, a specific file, a specific directory, a specific operation, and the like.

In an embodiment, the audit log captured for the service engineer during the limited access session to the user's website account can include resource types or names for the resources, such that automated programs can mine a specific audit trail or grouping of audit trails to identify service engineers reading or accessing resource types that they should not have been viewing, even with full access, such as Social Security Numbers (SSN), passwords, and the like.

In an embodiment, the user can select options in response to the request for limited access to user-define the access permissions (restrictions) that are to be enforced by the authenticator 121 when the service engineer access the user's website account. In an embodiment, the user can select specific resource types or resource names for which the service engineer is prohibited from reading or viewing during the service engineer's limited access session to the user's website account.

In an embodiment, the service engineer access the user's website account while the user is also logged into the website service in another session with the website service through the network-based interface 131. This may be useful if the service engineer has a voice or online chat with the user during the service engineer's limited access.

One now appreciates how efficient secure and limited access to a user's network-based service account can be granted to (and monitored) a remote support engineer without requiring any user credentials for such limited access. The user consents to the access and can user-defined access permissions (restrictions) on the limited access. Furthermore, the limited access can be actively and dynamically monitored and tracked for auditing. Moreover, the service engineer's access can be restricted to a pre-defined period of elapsed time; the elapsed time can begin: when the access link is activated, when the access link is delivered to the service engineer, after a configured period of time from when the access link is delivered to the service engineer (such as 2 days in case the access link is delivered late on a Friday or over a holiday break, or such as set by an enterprise (service personnel must address access links within 3 days of receipt). In an embodiment, the user can set the elapsed period of time and/or set when the elapsed period of time is to begin.

These and other embodiments are now discussed with reference to the FIGS. 2-4.

Figure 2:
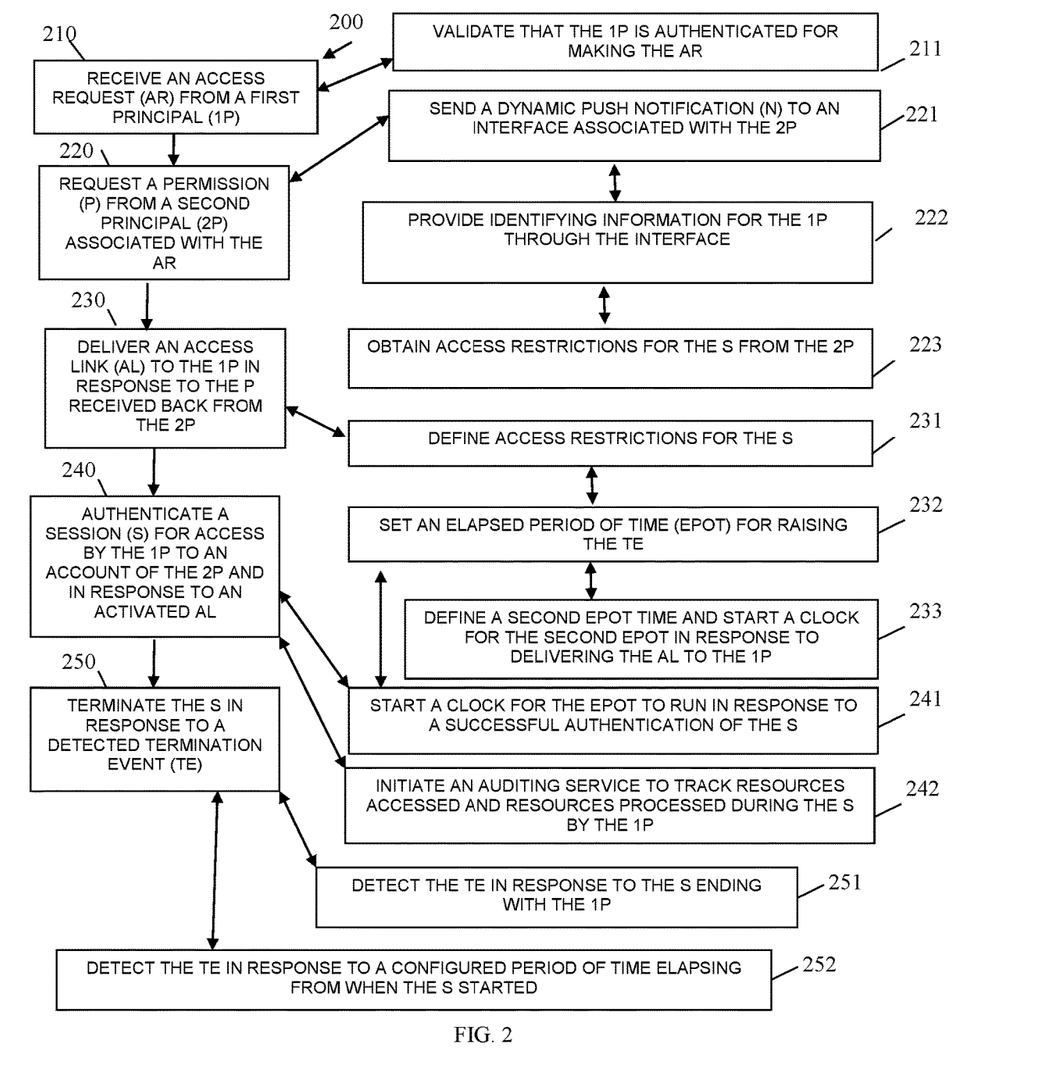
FIG. 2 is a diagram of a method for secure remote support authorization, according to an example embodiment.

FIG. 2 is a diagram of a method 200 for secure remote support authorization, according to an example embodiment. The software module(s) that implements the method 200 is referred to as a "remote access authenticator." The remote access authenticator is implemented as executable instructions programmed and residing within memory and/ or a non-transitory computer-readable (processor-readable) storage medium and executed by one or more hardware processors of a hardware computing device. The processors of the device that executes the remote access authenticator are specifically configured and programmed to process the remote access authenticator. The remote access authenticator has access to one or more networks during its processing. The networks can be wired, wireless, or a combination of wired and wireless.

In an embodiment, the device that executes the remote access authenticator is the network based server 120.

In an embodiment, the device that executes the remote access authenticator is a set of cooperating servers or devices organized as a cloud processing environment.

In an embodiment, the remote access authenticator is the network-based session service authenticator 121.

In an embodiment, the remote access authenticator is a third-party authentication service to the network-based service.

In an embodiment, the network-based service is a web service accessible through a website.

As used herein above and below, a "principal" refers to one of: 1) a user performing interactions with an interface from a user-operated device and 2) an automated service performing interactions from a device through an Application Programming Interface (API).

At 210, the remote access authenticator receives an access request from a first principal. In an embodiment, the first principal is the service engineer discussed above in the FIGS. 1A-1B. In an embodiment, the first principal is an automated service initiated by or through actions of a service engineer.

According to an embodiment, at 211, the remote access authenticator validates that the first principal is authenticated for making the access request. That is, the first principal has already performed multifactor authentication for access to the remote access authenticator.

At 220, the remote access authenticator requests a permission from a second principal. The second principal is identified from information provided with the access request. In an embodiment, the second principal is the user discussed above with the FIGS. 1A-1B. In an embodiment, the second principal is an automated bot that the user has provided authority to provide the permission on behalf of the user.

In an embodiment of 220 and 211, at 221, the remote access authenticator sends a dynamic push notification to an interface associated with the second principal. In an embodiment, the interface is the interface 131.

In an embodiment of 221 and at 222, the remote access authenticator provides identifying information for the first principal through the interface. In an embodiment, the identifying information is: a name associated with the first principal, a geographical location for a location of the first principal, and contact details for interacting with the first principal.

In an embodiment of 222 and at 223, the remote access authenticator obtains access restrictions for the session (discussed below at 240) from the second principal. In an embodiment, the access restrictions can be any of the above mentioned access permissions (restrictions) discussed above with the FIGS. 1A-1B.

At 230, the remote access authenticator delivers an access link to the first principal in response to receiving permission for the access request from the second principal. This is an interactive and dynamic response back from the second principal with the permission.

According to an embodiment, at 231, the remote access authenticator defines access restrictions for the session (discussed below at 240). Again, the access restrictions can be any of the above mentioned access permissions (restrictions) discussed above with the FIGS. 1A-1B.

In an embodiment of 231 and at 232, the remote access authenticator sets an elapsed period of time for raising the termination event (discussed at 250 below).

In an embodiment of 232 and at 233, the remote access authenticator defines a second elapsed period of time and starts a clock for the second elapsed period of time in response to the access link being delivered to first principal at 230.

At 240, the remote access authenticator authenticates a session for access by the first principal. The access is allowed during the session, when the session terminates access terminates to the account. The account belongs to the second principal (the principal providing the permission in response to requesting the permission at 220). The account is associated with a network-based service that belongs or is controlled by the second principal. The remote access authenticator establishes and activates the session in response to the first principal activating the access link. Moreover, the session is authenticated and proceeds with the first principal without ever exposing and without ever using credentials that are used by the second principal to access the account.

In an embodiment of 240 and 232, at 241, the remote access authenticator starts a clock for the elapsed period of time to run in response to a successful authentication and establishment of the session with the first principal.

In an embodiment, at 242, the remote access authenticator initiates an auditing service for tracking resources accessed and resources processed during the session by the first principal. In an embodiment, the resources include: files, web pages, and/or operations available through the network-based service when being accessed with as the account of the user.

At 250, the remote access authenticator terminates the session in response to a detected termination event being raised for the session.

According to an embodiment, at 251, the remote access authenticator detects the termination event in response to the session ending with the first principal (through direction of the first principal or through failure of some kind during the session).

In an embodiment, at 252, the remote access authenticator detects the termination event in response to a configured period of time elapsing from when the session was first started (at 240).

Figure 3:
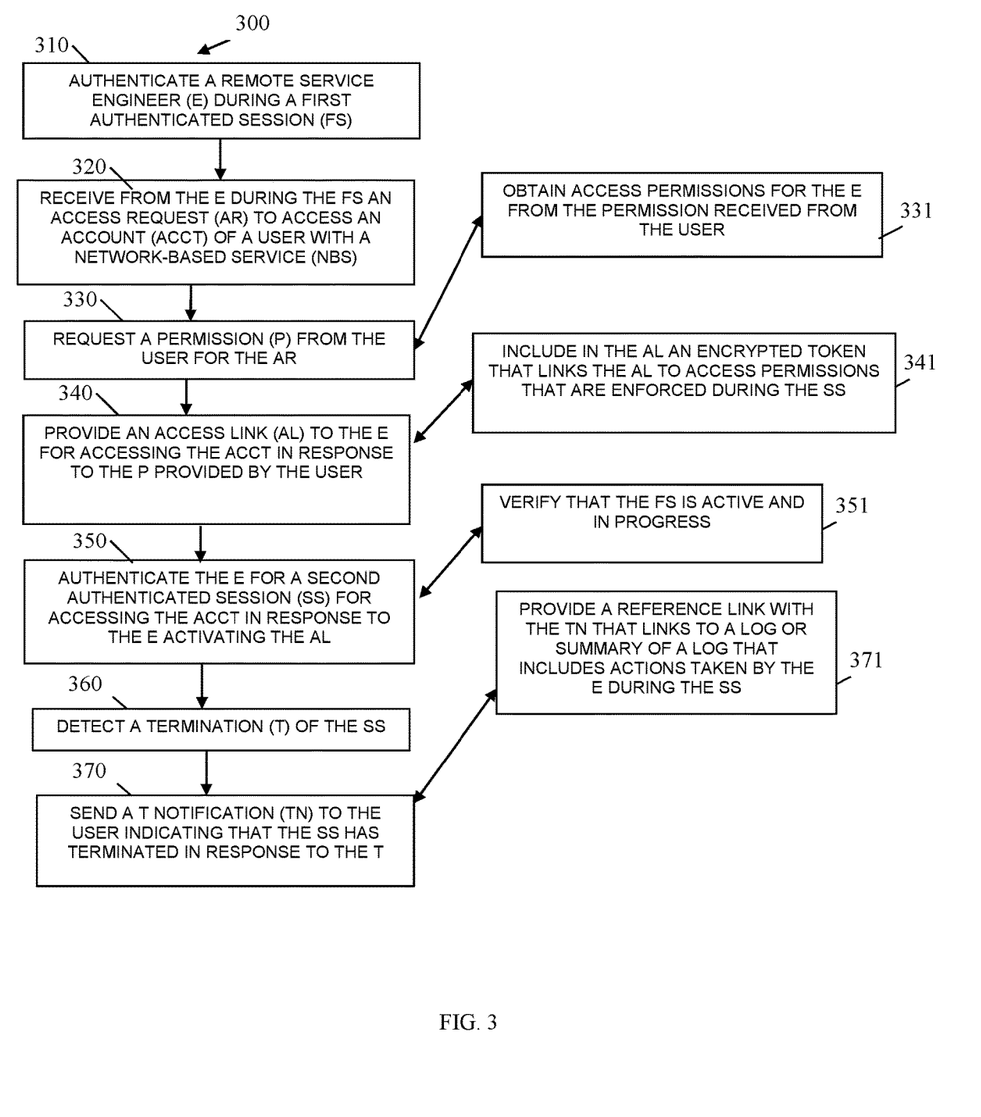
FIG. 3 is a diagram of another method for secure remote support authorization, according to an example embodiment.

FIG. 3 is a diagram of another method 300 for secure remote support authorization, according to an example embodiment. The software module(s) that implements the method 300 is referred to as a "remote session authenticator." The remote session authenticator is implemented as executable instructions programmed and residing within memory and/or a non-transitory computer-readable (processor-readable) storage medium and executed by one or more hardware processors of a hardware device. The processors of the device that executes the remote session authenticator are specifically configured and programmed to process the remote session authenticator. The remote session authenticator has access to one or more networks during its processing. The networks can be wired, wireless, or a combination of wired and wireless.

The remote session authenticator presents another and in some ways enhanced perspective of the method 200.

In an embodiment, the device that executes the remote session authenticator is the network based server 120.

In an embodiment, the device that executes the remote session authenticator is a set of cooperating servers or devices organized as a cloud processing environment.

In an embodiment, the remote session authenticator is the network-based session service authenticator 121.

In an embodiment, the remote session authenticator is a third-party authentication service to the network-based service.

In an embodiment, the network-based service is a web service accessible through a website.

At 310, the remote session authenticator authenticates a remote service engineer (engineer) during a first authenticated session with a network-based service. In an embodiment, the engineer is the service engineer discussed above with the FIGS. 1A-1B. In an embodiment, the engineer is the first principal discussed above with the FIG. 2.

At 320, the remote session authenticator receives from the engineer during the first authenticated session an access request to access an account of a user with the network-based service.

At 330, the remote session authenticator requests a permission from the user for the access request made by the engineer.

In an embodiment, at 331, the remote session authenticator obtains access permissions for the engineer's access to the account from the permission received back from the user.

At 340, the remote session authenticator provides an access link to the engineer for accessing the account in response and assuming the user provided the permission.

In an embodiment, at 341, the remote session authenticator includes in the access link an encrypted token (can also be digitally signed) that links the access link to access permissions. The remote session authenticator enforces the access permissions during a second authenticated session (discussed below at 350).

The access permissions can be any of the access permissions (restrictions) discussed above with the FIGS. 1A-1B and 2.

At 350, the remote session authenticator authenticates the engineer for a second authenticated session for accessing the account of the user. The second session is established and authenticated in response to the engineer activating the access link provided at 340).

According to an embodiment, at 351, the remote session authenticator verifies that the first authenticated session is active and in progress. This ensures that the engineer is already authenticated to the network-based service.

At 360, the remote session authenticator detects a termination of the second authenticated session indicating that the second authenticated session has terminated (by the engineer, by failure of some sort, or by actions actively taken by the remote session authenticator to terminate the second session).

At 370, the remote session authenticator sends a termination notification to the user that indicates that the second authenticated session has terminated in response to the detected termination at 360.

In an embodiment, at 371, the remote session authenticator provides a reference link with the transaction notification that links a log or a summary of a log and that includes actions or a summary of actions or notes taken by or provided by the engineer during and/or after the second authenticated session.

Figure 4:
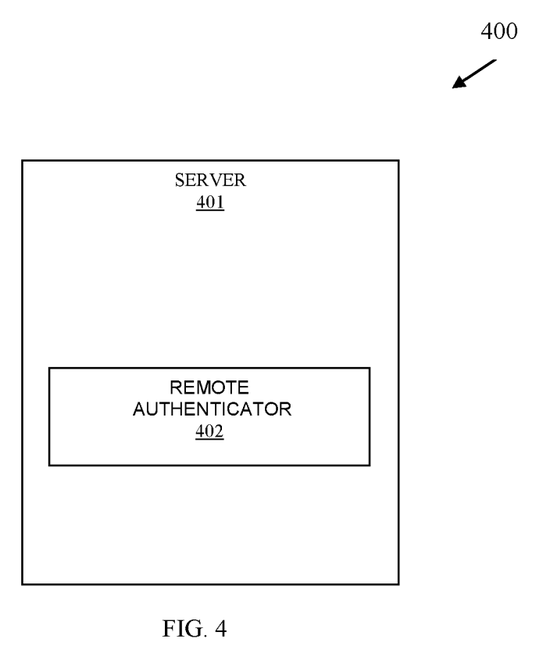
FIG. 4 is a diagram of another system for secure remote support authorization, according to an example embodiment.

FIG. 4 is a diagram of another system 400 for secure remote support authorization, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1B and 2-3.

In an embodiment, the system 400 implements, inter a/ia, the method 200 of the FIG. 2.

In an embodiment, the system 400 implements, inter alia, the method 300 of the FIG. 3.

The system 400 includes a server 401 and the server including a remote authenticator 402.

Cross-platform authenticator 402 is configured to: 1) execute on at least one hardware processor of the server 401; 2) obtain a permission from a user for a remote service engineer to access an account of the user, 3) provide a limited-access link to the remote service engineer in response to the permission received from the user, and 4) enforce access restrictions when the remote service engineer activates the limited-access link to access the account.

In an embodiment, the remote authenticator 402 is further configured, in 3) to: embed a reference that links to the access restrictions within the limited-access link.

In an embodiment, the remote authenticator 402 is further configured to: 5) send a summary to the user in response to a session terminating, wherein during the session the remote service engineer accesses the account.

In an embodiment, the remote authenticator 402 is all or some combination of: the processing discussed in the FIG. 1B, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
   authenticating a service engineer in a first support session, wherein the first support session is a first authenticated support session;
   receiving a request during the first support session from the service engineer requesting access to a user's account associated with a network service;
   dynamically requesting an approval of a user associated with the user's account;
   obtaining access permissions to enforce on the service engineer for a second support session with the service engineer during which the service engineer has access to the user's account based on receiving the approval from the user, wherein the access permissions include restricted read access on first account resources of the user's account and restricted write access on second account resources of the user's account, wherein the second support session is a second authenticated support session and is initiated from and within the first authenticated support session;
   providing an access link to the service engineer during the first support session, wherein the access link comprises a token associated with the service engineer, the user's account, and the access permissions;
   receiving the token when the service engineer activates the access link from and within the first support session;
   obtaining the user's account, the approval, and the access permissions from the token associated with the access link; and
   providing the service engineer access to the user's account in the second support session while enforcing the access permissions against the service engineer during the second support session.

2. The method of claim 1, wherein the dynamically requesting further includes providing the user with contact details and a current location of the service engineer based on the first support session.

3. The method of claim 1, wherein the obtaining the access permissions further includes receiving the access permissions from the user with the approval.

4. The method of claim 1, wherein the obtaining the access permissions further includes receiving selected options from the user that identify specific resources or specific types of resources that the user wants to prohibit the service engineer from accessing during the second support session.

5. The method of claim 1, wherein the providing the access link further includes encrypting the token within the access link.

6. The method of claim 1, wherein the providing the access link further includes providing the access link as a Hypertext Markup Language (HTML) over a Hypertext Transfer Secure Socket Layer (HTTPS) link to a browser-based interface associated with the first support session of the service engineer.

7. The method of claim 1 further comprising, terminating the second support session when actions taken by the service engineer during the second support session violate the access permissions.

8. The method of claim 1 further comprising, terminating the second support session when a predefined time limit associated with an access restriction is reached.

9. The method of claim 1 further comprising, maintaining a user session with the user during the second support session.

10. The method of claim 9, wherein the maintaining further includes maintaining a chat session between the user of the user session and the service engineer of the second support session as the service engineer accesses the network service using the user's account.

11. The method of claim 1 further comprising, tracking and auditing actions of the service engineer during the second support session.

12. A method comprising:
receiving a service request from a service engineer requesting access to a network service associated with a user's account of a user based on a service ticket being handled by the service engineer wherein the service request originates in a first authenticated session of the service engineer and the network service;
identifying a service-engineer device being operated by the service engineer and a current location of the service engineer;
obtaining contact information for the service engineer;
requesting an approval in real time from the user to authorize the service engineer to access the network service using the user's account and providing the user the contact information for the service engineer and the current location of the service engineer;
obtaining the approval and access permissions from the user, wherein the access permissions include restricted read access on first account resources of the user's account and restricted write access on second account resources of the user's account;
providing an access link comprising a token linked to the user's account, the approval, and the access permissions to the service engineer within the first authenticated session with the service engineer;
identifying an activation of the access link by the service engineer from the first authenticated session and obtaining the token;
obtaining the user's account, the approval, and the access permissions and authorizing the service engineer for access to the network service using the user's account within a second authenticated session; and
enforcing the access permissions during the second authenticated session during which the service engineer accesses the network service using the user's account.

13. The method of claim 12 further comprising, terminating the second authenticated session based on one or more of an action taken by the service engineer that violates any of the access permissions, an abnormal network disconnection between the service-engineer device and the network service, a network disconnection of the second authenticated session issued by the service engineer, and expiry of an elapsed period of time associated with an access restriction of the second authenticated session.

14. The method of claim 13 further comprising, notifying the user when the second authenticated session terminates.

15. The method of claim 12 further comprising tracking actions of the service engineer during the second authenticated session and maintaining an audit log of the actions.

16. The method of claim 12, wherein the providing the access link further includes ensuring that the access link was activated by the service engineer from the service-engineer device within the first authenticated session and disregarding any activation of the access link originating outside of the first authenticated session.

17. The method of claim 12, wherein the obtaining the approval further includes receiving the access permissions from the user as authorized and non-authorized selected options for types of resources and specific resources associated with the network service of the user's account.

18. The method of claim 12, wherein the providing the access link further includes encrypting the token within the access link.

19. A system comprising:
a server comprising a processor and a non-transitory computer-readable storage medium;
the non-transitory computer-readable storage medium comprising executable instructions;
the executable instructions executed by the processor causing the processor to perform operations comprising:
authenticating a service engineer and a service-engineer operated device for access to a service authenticated session;
receiving a service request from the service engineer based on a service ticket that requests access to a network service using a user account of a user;
obtaining contact information for the service engineer and a current location of the service-engineer operated device;
obtaining user contact information for the user based on the user account;
dynamically requesting an approval and access permissions to grant the service engineer for accessing the network service from the user and providing the user the contact information for the service engineer and the current location of the service-engineer operated device, wherein the access permissions include restricted read access on first account resources of the user account and restricted write access on second account resources of the user account;
obtaining the approval and the access permissions from the user;
associating the approval, the user account, the access permissions, the service engineer, and the service authenticated session with a token;
providing an access link comprising the token to the service engineer within the service authenticated session;
detecting that the access link was activated by the service engineer from the service authenticated session;
obtaining the token from the access link;
obtaining the user account, access permissions, and an identifier for the service authenticated session from the token;
ensuring that the access link was activated by the service engineer from within the service authenticated session; and
granting access to the network service using the user account in accordance with the access permissions to the service engineer in a second authenticated session.

20. The system of claim 19, wherein the executable instructions executed by the processor from the non-transitory compute r-readable storage medium further causing the processor to perform additional operations comprising:

tracking and auditing actions of the service engineer during the second authenticated session.

\* \* \* \* \*